B. A. PETERSON.
PATTERN CONTROLLED MEANS FOR DISTRIBUTING HEDDLES OR THE LIKE.
APPLICATION FILED FEB. 17, 1908.
1,019,915.
Patented Mar. 12, 1912.
5 SHEETS—SHEET 5.
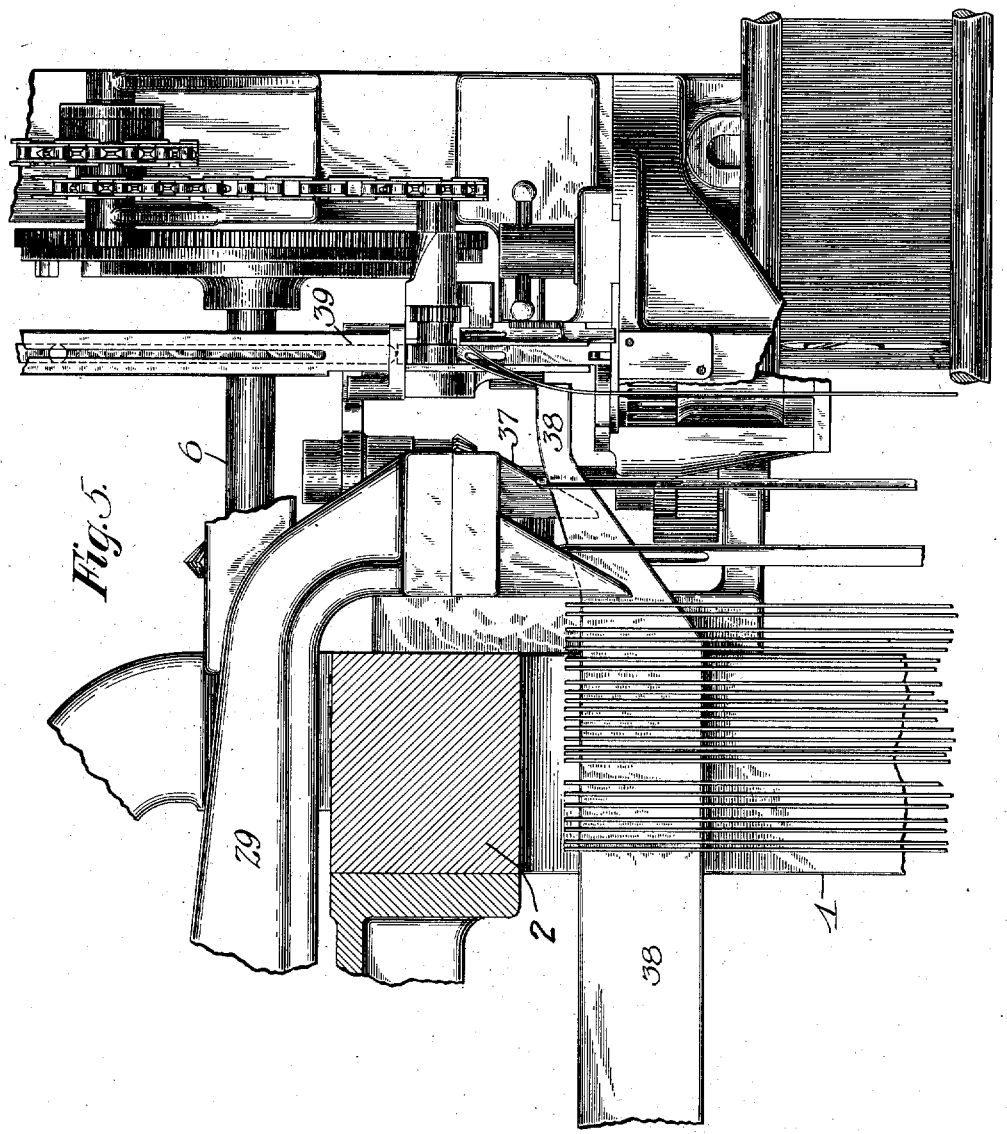

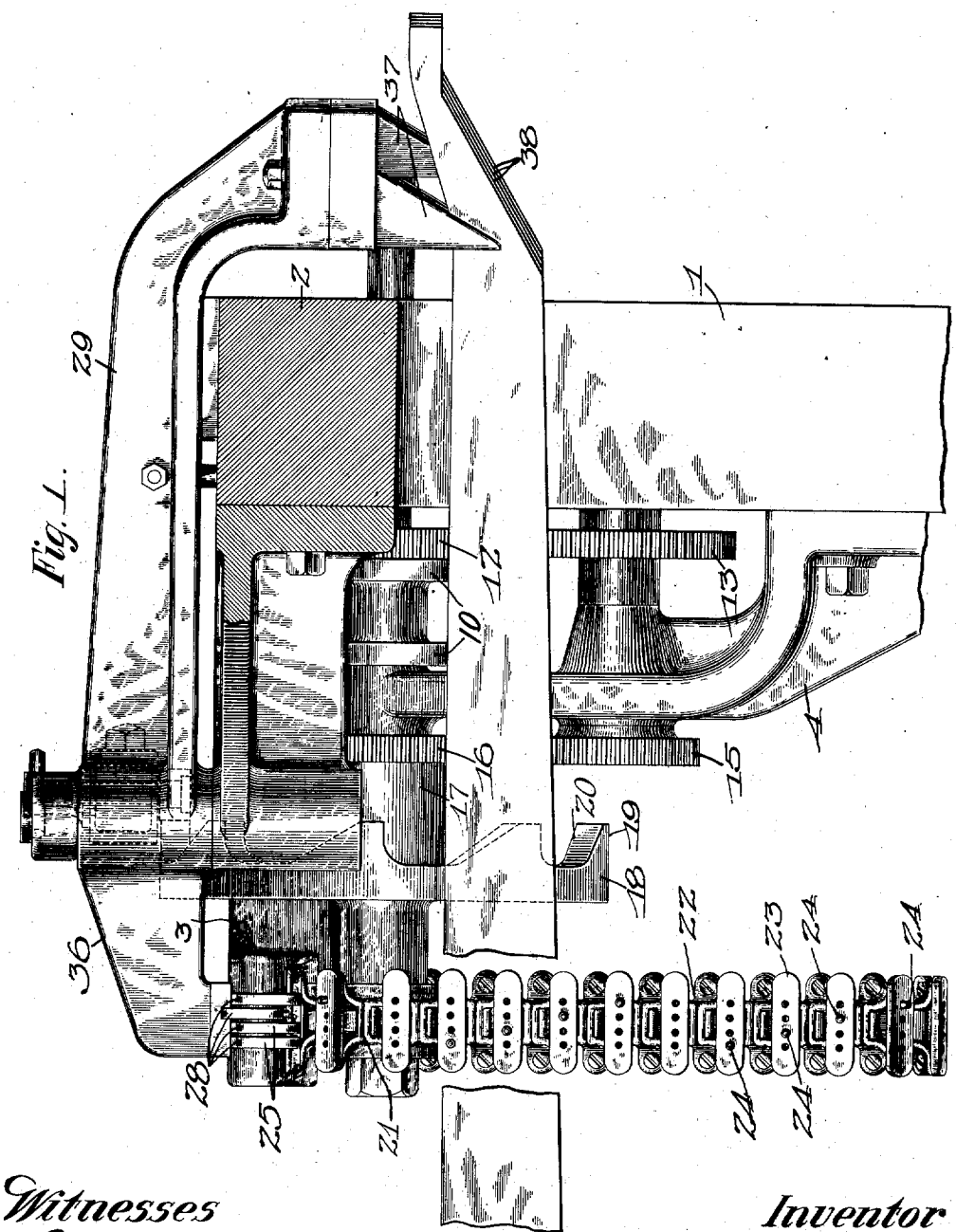

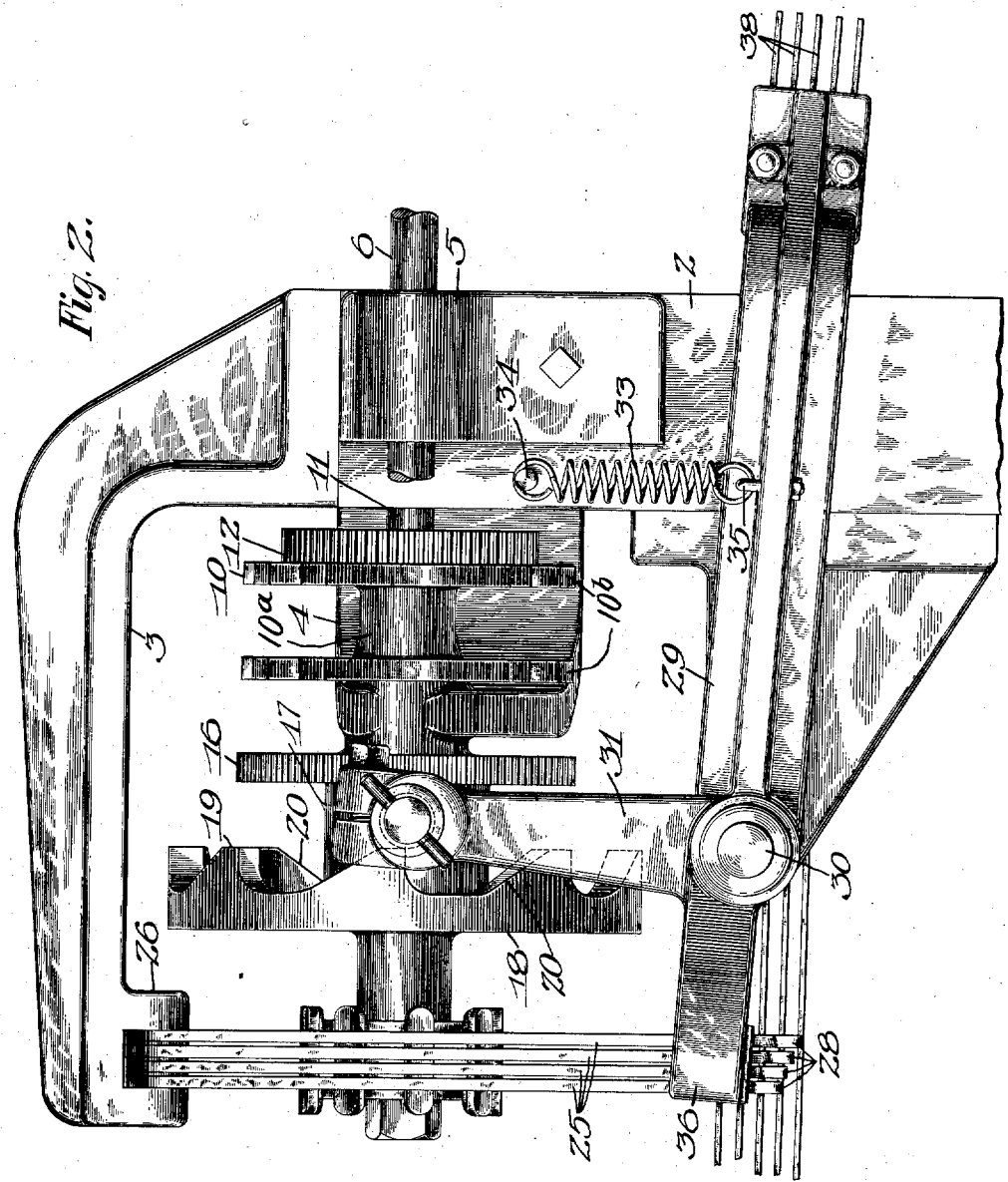

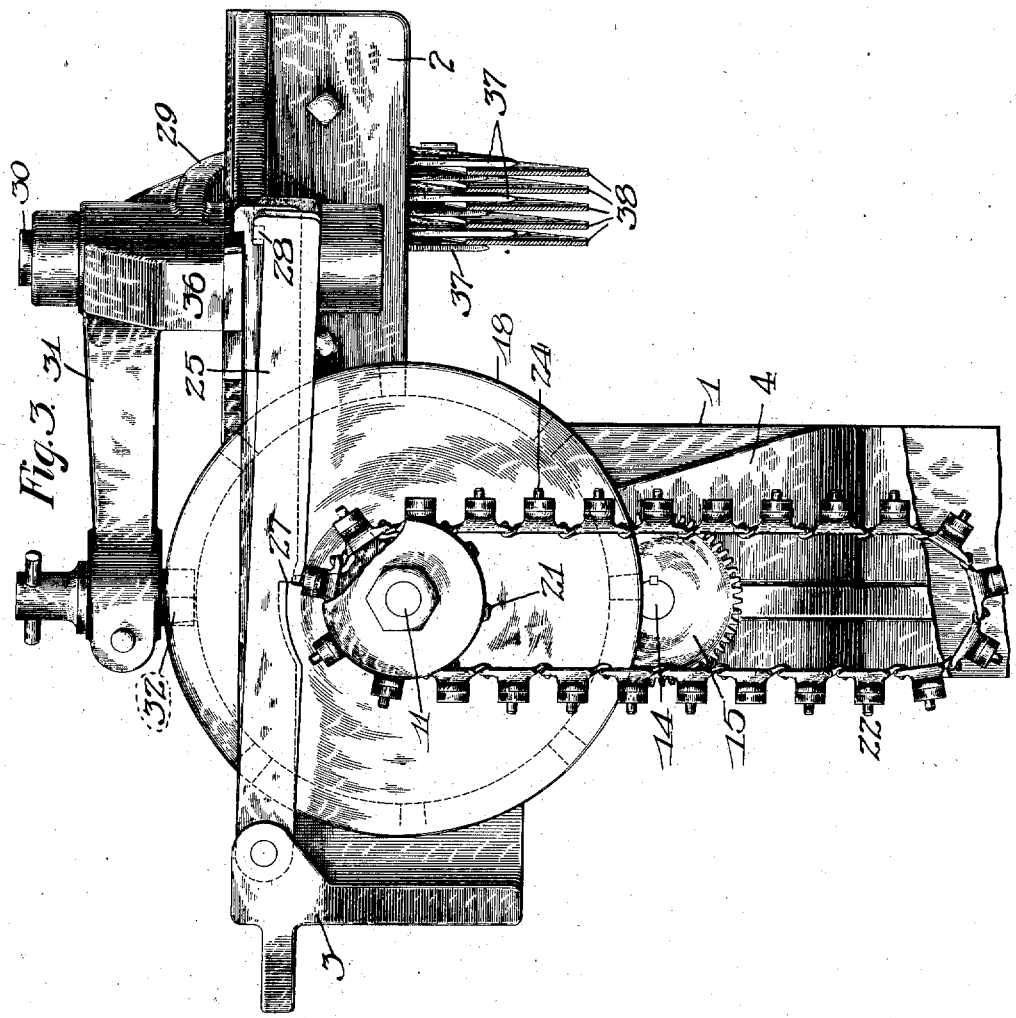

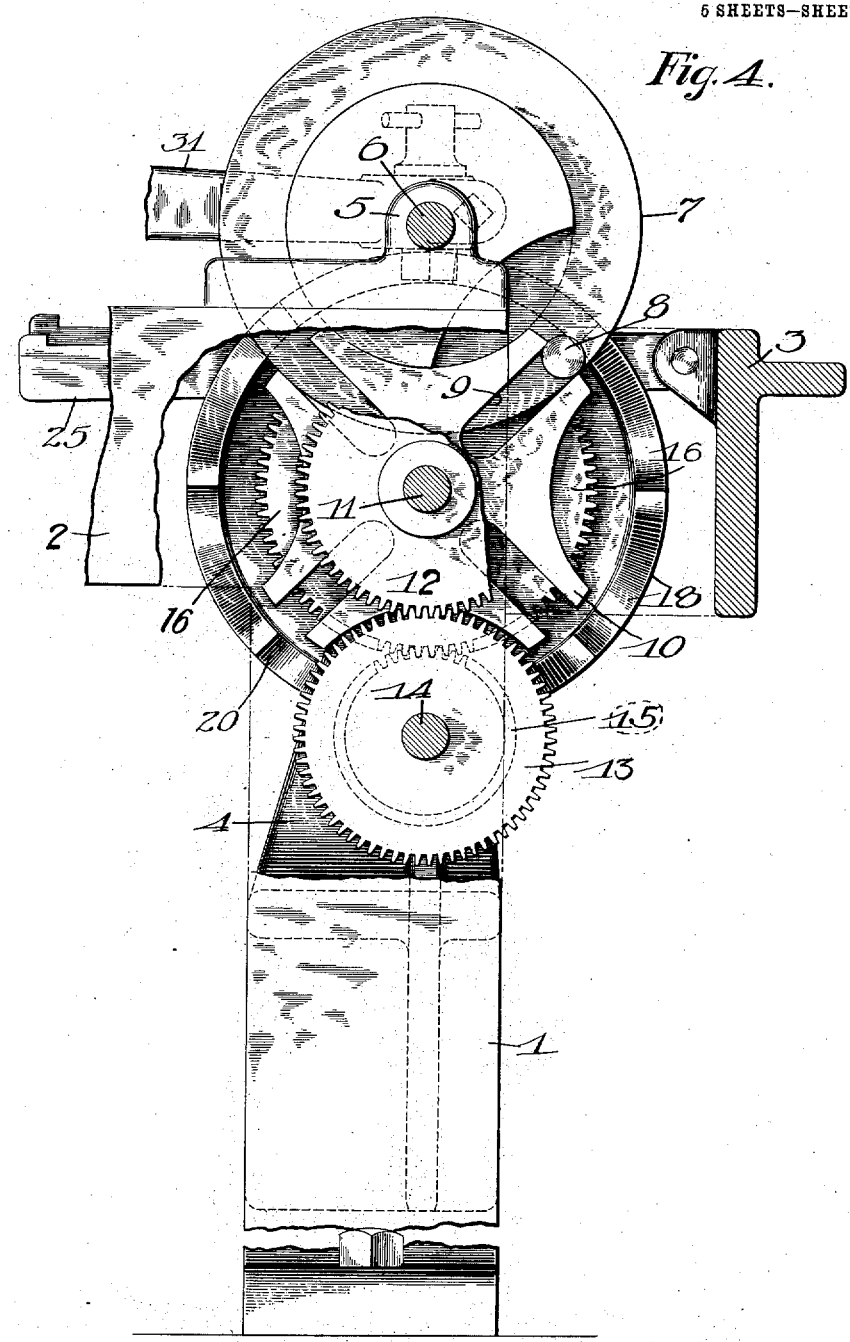

UNITED STATES PATENT OFFICE.

BURT A. PETERSON, OF ROCKFORD, ILLINOIS, ASSIGNOR, BY MESNE ASSIGNMENTS, TO BARBER-COLMAN COMPANY, OF ROCKFORD, ILLINOIS, A COPARTNERSHIP.

PATTERN-CONTROLLED MEANS FOR DISTRIBUTING HEDDLES OR THE LIKE.

1,019,915.      Specification of Letters Patent.      Patented Mar. 12, 1912.

Application filed February 17, 1908. Serial No. 416,205.

*To all whom it may concern:*

Be it known that I, BURT A. PETERSON, a citizen of the United States, residing at Rockford, in the county of Winnebago and State of Illinois, have invented certain new and useful Improvements in Pattern-Controlled Means for Distributing Heddles or the Like, of which the following is a specification.

This invention relates to mechanism for taking a plurality of elements from a common supply and arranging them in appropriate groups.

The invention is capable of utilization with textile machines and it contemplates the provision of means for automatically grouping heddles and kindred elements in a predetermined series.

One object is to provide means for regulating the number of heddles or kindred elements which shall comprise a particular group; also for regulating the order of introduction of the successive heddles to the respective groups.

The invention is shown as comprising a plurality of receiving elements any one or all of which may be presented to the source of supply at determined intervals.

The receiving elements are shown as bars, so it may be advisable to here state that the number of bars employed will depend upon the contemplated pattern to be effected by the loom. In the present instance, I have shown five bars and means for determining which one shall be presented to the supply at any given time. The order of presentation of the respective bars to the supply may be determined by pattern mechanism to be hereinafter described.

In the drawings, Figure 1 is a side elevational view of the casting, and its associated mechanism. Fig. 2 is a plan view of the same, parts being removed. Fig. 3 is an end view showing parts of my invention. Fig. 4 is a view from the opposite end of the device, parts being broken away to show the Geneva stop motion and its associated gearing. Fig. 5 is a view partly in elevation and partly in section showing the discharge end of the supply reservoir and parts of the stringer bars, one of which is in position to receive a discharge element, as for example, a heddle.

In Fig. 5 I have illustrated a conventional form of heddle, but it is to be understood that the device is applicable to use in connection with other forms of heddles, or drop wires used in connection with loom stop motions, or indeed any element capable of being strung. In the form of the invention illustrated, I have shown a standard 1 which supports the casting 2. 3 is a bracket arm to receive and loosely support a plurality of stop elements to be specifically described hereinafter. 4 is a journal bracket which supports the driven shaft carrying the Geneva stop motion and associated gearing, and this journal bracket is shown as being supported by the standard 1. In the journal 5 on the casting 2 is a drive shaft 6, which may receive motion from any source. The drive shaft 6 carries a disk 7 provided with a pin 8 capable of successively engaging the respective slots 9 of the star wheel 10 fixed on the driven shaft 11. The star wheel 10 comprises a hub 10$^a$ and two flanges 10$^b$ between which the disk 7 lies. A gear 12 may be fixed on the shaft 11, or what will be in effect the same, rigid with the star wheel 10. The gear 12 meshes with a gear 13 on a jack shaft 14 supported in the bracket 4 and carrying a gear 15 meshing with a gear 16 on the sleeve 17 loose on the driven shaft 11. The sleeve 17 carries a cam 18 comprising a disk provided with a peripheral flange 19, the edge of which is shown as having a plurality of cam notches 20, each notch being a counter-part of the other. On the end of the sleeve 17 is a sprocket 21 to receive the links of a pattern chain 22. The pattern chain is provided with bars 23 in which are removable pins 24. Superposed above the pattern chain and the sprocket are a plurality of stop members illustrated as pivoted bars 25 carried by the bifurcated portion 26 of the bracket arm 3 and having escapement notches 27 immediately above the sprocket 21; and consequently immediately above the uppermost point of travel of the respective pins 24. The bars 25 are also provided with lugs or projection 28, the projection on each bar being out of alinement with those of adjacent bars. 29 is a swinging switch arm pivoted on the casting and held by the pin 30. Projecting laterally from said arm and adapted to be engaged by the notches 20 of the cam 18 is a finger 31, the roller 32 of which is capable of being moved into the notches through the action of a tension spring 33 anchored at 34 on the casting and engaging an eye 35 on said arm 29. 36 is a finger carried by the arm 29 and adapted to be engaged by a selected bar 25 actuated by the pattern chain. Depending from the arm 29 are a plurality of positioning fingers 37 between which are arranged the stringer bars 38. These stringer bars may be suitably supported so as to have a lateral swinging motion whereby they may be moved into operative alinement with the discharge end of a heddle supply preparatory to receiving the heddles or their kindred elements.

The specific form of supply constitutes no part of this invention, therefore, any appropriate mechanism for feeding the heddles to be introduced to the stringer bars may be provided. The supply shown has been designated 39, and, in view of the fact that any form of supply may be employed I deem it unnecessary to give a detailed description of any particular embodiment in this application.

All of the parts being assembled, motion will be communicated to the drive shaft 6, which will give a rotatory motion to the disk 7, thereby intermittently and successively causing the pin 8 to engage the respective slots of the star wheel 10. The intermittent rotatory motion imparted to the star wheel 10 will be effective in causing a corresponding movement to the gear 12. As this gear 12 is in mesh with the gear 13, the gear 13, the jack shaft 14 and the gear 15 will likewise be moved and impart movement to the gear 16 and its sleeve 17 upon which are the cam, the sprocket, and the pattern chain. As has been hereinbefore explained, the movement of the pattern chain over the sprocket wheel will be effective in raising a particular bar 25, and a particular position of the pin 24 on the bar 23 of the pattern chain will determine which bar 25 is to be raised during the travel of the pattern chain around the sprocket. The tension spring 33 will have a tendency to pull the arm 29 toward its anchor 34, but the movement of the arm 29 will be limited by a stop bar 25 which happens to be raised by a pin from the pattern chain. When the arm 29 is in the position indicated in Fig. 1, the third stop arm is raised and this position is what might be termed the third position of the arm inasmuch as this position of the switch arm 29 will be effective in shifting the third stringer arm into operative alinement with the discharge end of the source of supply. The arm 29 will be moved to the position shown in Fig. 2 by one of the cam notches 20. After the high point of the cam has passed the roller 32, the spring 33 will swing the arm 29 to carry the finger 36 into engagement with the lug 28 upon one of the bars 25 which has been lifted by one of the pins 24 upon the pattern chain 22. The pin 24 now passes out of operative engagement with said stop bar 25 and moves into the escapement notch 27. But the arm 29 will still be held in this position (to allow time for stringing the heddle) by reason of the shape of the lugs 28 and the finger 36 until the next movement of the cam engages the roller 32 and causes the finger 36 to swing back and allow bar 25 to drop. By that time another pin or the next succeeding pin on the chain will have come into contact either with the same arm previously raised, or with another arm. If the same arm is raised, of course, the switch arm 29 will return to its previous position, in which event the heddles will continue to feed on the same bar until a new bar is selected. If a different stop arm is raised and the previously raised stop arm is permitted to drop, the switch arm 29 will be shifted to a different position and one of the stringer bars, other than the one just previously presented to the receiving end of the source of supply, will be switched into operative alinement with said source of supply and receive its heddle. When there is no pin on a bar 23, the projection 32 on the finger 31 will be permitted to swing to the bottom or inner edge of one of the cam notches 20 on the cam 18, and, in this event, the last stringer bar will be presented to the discharge end of the source of supply.

It will be observed that there are five stringer bars and four stop bars 25. By utilizing the inner edge of the cam notches 19 as a stop, I am able to dispense with one of the bars 25. The switch arm 29 will be restored to its first position as shown in Fig. 2, so as to overcome the spring 33 by the contour of the notch of the cam which, during the rotation of the cam, will cause the projection 32 to ride up the cam surface of the edge of the notch and swing the switch bar into the position shown in Fig. 2.

From the foregoing it will be apparent that the grouping of the heddles on the stringer bars may be conveniently controlled by positioning the pins on the bars of the pattern chain and that the position of these pins will absolutely determine the order of introduction of the heddles on the respective stringer bars, therefore, the heddles may be arranged for various patterns so as to provide different fancy weaves. When a plain weave is to be effected the pattern chain and bars 25 may be dispensed with and a cam 18 substituted which will cause the arm 29 to present the stringer bars successively and uniformly to the discharge end of the supply, so that at the end of the operation there will be the same number of heddles on each bar.

I claim as my invention:

1. The combination, with a pivoted switch arm, and means for swinging said arm, of a pattern chain, and means interposed between the pattern chain and the switch arm whereby the movement of the pattern chain will determine the extent of swinging movement of the switch arm.

2. The combination, with a switch arm, and means for moving said arm of a plurality of receiving elements movable by said switch arm, and means to limit the movement of said switch arm.

3. The combination, with a switch arm, of a plurality of receiving elements movable by said switch arm, and intermittently actuated stop arms for limiting the movement of the switch arm.

4. The combination, with a switch arm, of a plurality of receiving elements movable by said switch arm, a pattern chain, and means interposed between the pattern chain and the switch arm for limiting the movement of said switch arm.

5. The combination with a switch arm, of receiving elements movable by said switch arm, stop bars for limiting the movement of said switch arm, and a pattern chain having pins adapted to contact with said stop bars to determine which bar is to control the switch arm.

6. The combination with a switch arm, of receiving elements movable by said switch arm, stop bars for limiting the movement of said switch arm, and a pattern chain having removable pins adapted to contact with said stop bars to determine which bar is to control the switch arm.

7. The combination with a switch arm, of receiving elements movable by said switch arm, stop bars for limiting the movement of said switch arm, and a pattern chain having pins in staggered relation adapted to contact with said stop bars to determine which bar is to control the switch arm.

8. The combination with a switch arm, of a plurality of receiving elements movable by said switch arm, means for actuating said switch arm, and a pattern chain for controlling the movement of said switch arm.

9. The combination, of a plurality of heddle-receiving elements, means for feeding the heddles to said elements, means for placing said receiving elements in operative relation to the feeding means, and a pattern chain having appropriate mechanism for determining which of said receiving elements will be placed in operative relation to the feeding means.

10. In a device of the character described, in combination, a switch arm; means for positively moving said arm in one direction; means for yieldingly moving said arm in another direction; and pattern-controlled means for limiting the movement of said arm in the last mentioned direction.

11. In a device of the character described, in combination, a pivoted switch arm; means for positively swinging said arm in one direction; a spring for swinging said arm in the opposite direction; and pattern-controlled means for limiting the spring-caused movement of the arm.

12. In a device of the character described, in combination, a pivoted switch arm; means for positively swinging said arm in one direction; a spring for swinging said arm in the opposite direction; a plurality of pivoted members adapted to engage said arm to limit its spring-caused movement; and pattern-controlled means for moving said pivoted members into operative relation to said switch arm.

13. In a device of the character described, in combination, a pivoted switch arm; a finger fixed to said arm; a cam wheel adapted to engage said finger to swing said switch arm positively in one direction; a spring for swinging said switch arm in the opposite direction; a second finger fixed to said switch arm; a plurality of pivoted bars having projections thereon adapted to engage said second finger; and means for pivotally moving said bars into a position to engage said second finger and thereby limit the spring-caused movement of said switch arm.

14. In a device of the character described, in combination, a plurality of stringer bars; a pivoted switch arm engaging said stringer bars; a finger fixed to said switch arm; a shaft; a cam wheel on said shaft; means for rotating said cam wheel, said wheel being arranged periodically to engage said finger to swing said switch arm positively in one direction; a spring for swinging said switch arm in the opposite direction; a sprocket wheel mounted on said shaft and fixed with relation to said cam wheel; a second finger on said switch arm; a plurality of pivoted bars each provided with a projection adapted to engage said second finger, said spring serving to hold such projection and said second finger in engagement; and a pattern chain mounted on said sprocket wheel and adapted to swing said bars.

15. The combination of a switch arm, a heddle-receiving element movable by said arm, means for moving said arm, stop members adapted to engage said switch arm to limit the movement thereof, and means for intermittently actuating said stop members, the latter being adapted to remain in engagement with the switch arm for a period after said members have been actuated by their actuating means.

16. The combination with a switch arm, of heddle-receiving elements movable by said switch arm, hooked stop bars adapted to engage said arm to limit its movement, and a pattern chain having pins adapted to contact with said stop bars to move said bars into hook engagement with said switch arm, said engagement continuing after the pin has left the bar.

BURT A. PETERSON.

Witnesses:
H. B. ELMERS,
M. S. SWEET.

---

Copies of this patent may be obtained for five cents each, by addressing the "Commissioner of Patents, Washington, D. C."

---

Corrections in Letters Patent No. 1,019,915.

It is hereby certified that in Letters Patent No. 1,019,915, granted March 12, 1912, upon the application of Burt A. Peterson, of Rockford, Illinois, for an improvement in "Pattern-Controlled Means for Distributing Heddles or the Like," errors appear in the grant and in the heading to the printed specification requiring correction as follows: In the grant, strike out lines 9–11, and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois,*

Strike out the first two lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns*

In the heading to the printed specification strike out the words "to Barber-Colman Company, of Rockford, Illinois, a copartnership." and insert the words

*to Howard D. Colman, Luther L. Miller, and Harry A. Severson, copartners, doing business as Barber-Colman Company, of Rockford, Illinois.;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.*

16. The combination with a switch arm, of heddle-receiving elements movable by said switch arm, hooked stop bars adapted to engage said arm to limit its movement, and a pattern chain having pins adapted to contact with said stop bars to move said bars into hook engagement with said switch arm, said engagement continuing after the pin has left the bar.

BURT A. PETERSON.

Witnesses:
H. B. ELMERS,
M. S. SWEET.

---

Copies of this patent may be obtained for five cents each, by addressing the "Commissioner of Patents, Washington, D. C."

---

Corrections in Letters Patent No. 1,019,915.

It is hereby certified that in Letters Patent No. 1,019,915, granted March 12, 1912, upon the application of Burt A. Peterson, of Rockford, Illinois, for an improvement in "Pattern-Controlled Means for Distributing Heddles or the Like," errors appear in the grant and in the heading to the printed specification requiring correction as follows: In the grant, strike out lines 9–11, and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois,*

Strike out the first two lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns*

In the heading to the printed specification strike out the words "to Barber-Colman Company, of Rockford, Illinois, a copartnership." and insert the words

*to Howard D. Colman, Luther L. Miller, and Harry A. Severson, copartners, doing business as Barber-Colman Company, of Rockford, Illinois.;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.*

It is hereby certified that in Letters Patent No. 1,019,915, granted March 12, 1912, upon the application of Burt A. Peterson, of Rockford, Illinois, for an improvement in "Pattern-Controlled Means for Distributing Heddles or the Like," errors appear in the grant and in the heading to the printed specification requiring correction as follows: In the grant, strike out lines 9-11, and insert the following statement:

*He having assigned his right, title, and interest in said improvement, by mesne assignments, to Howard D. Colman, Luther L. Miller, and Harry A. Severson, copartners, doing business as Barber-Colman Company, of Rockford, Illinois,*

Strike out the first two lines of the granting clause and insert the following:

*Now, therefore, these Letters Patent are to grant unto the said Howard D. Colman, Luther L. Miller, and Harry A. Severson, copartners, doing business as Barber-Colman Company, of Rockford, Illinois, their heirs or assigns*

In the heading to the printed specification strike out the words "to Barber-Colman Company, of Rockford, Illinois, a copartnership." and insert the words *to Howard D. Colman, Luther L. Miller, and Harry A. Severson, copartners, doing business as Barber-Colman Company, of Rockford, Illinois.;* and that the said Letters Patent should be read with these corrections therein that the same may conform to the record of the case in the Patent Office.

Signed and sealed this 18th day of March, A. D., 1913.

[SEAL.]

C. C. BILLINGS,
*Acting Commissioner of Patents.*